(12) United States Patent
Wang et al.

(10) Patent No.: US 8,910,233 B2
(45) Date of Patent: Dec. 9, 2014

(54) SIGNAL PROCESSING APPARATUSES CAPABLE OF PROCESSING INITIALLY REPRODUCED PACKETS PRIOR TO BUFFERING THE INITIALLY REPRODUCED PACKETS

(75) Inventors: Ching-Chieh Wang, Yilan County (TW); You-Min Yeh, Taipei (TW); Chin-Wang Yeh, Hsinchu (TW); Rong-Liang Chiou, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 392 days.

(21) Appl. No.: 12/622,437

(22) Filed: Nov. 20, 2009

(65) Prior Publication Data
US 2010/0157158 A1 Jun. 24, 2010

Related U.S. Application Data

(60) Provisional application No. 61/139,659, filed on Dec. 22, 2008, provisional application No. 61/139,662, filed on Dec. 22, 2008.

(51) Int. Cl.
*H04N 7/16* (2011.01)
*H04N 21/2389* (2011.01)
*H04N 21/236* (2011.01)
*H04N 21/426* (2011.01)
*H04N 21/4385* (2011.01)
*H04N 21/2362* (2011.01)
*H04N 21/434* (2011.01)

(52) U.S. Cl.
CPC ..... *H04N 21/2389* (2013.01); *H04N 21/23608* (2013.01); *H04N 21/426* (2013.01); *H04N 21/4385* (2013.01); *H04N 21/2362* (2013.01); *H04N 21/434* (2013.01)
USPC ............................ 725/141; 725/151; 725/153

(58) Field of Classification Search
USPC .................. 725/139, 141, 151, 153
See application file for complete search history.

(56) References Cited

U.S. PATENT DOCUMENTS 5,970,386 A * 10/1999 Williams ........................ 725/69
6,115,074 A 9/2000 Ozkan
(Continued)

FOREIGN PATENT DOCUMENTS

CN 1722787 A 1/2006
CN 101605204 A 12/2009
(Continued)

OTHER PUBLICATIONS

International application No. PCT/CN2009/075755, International filing date: Dec. 21, 2009, International Search Report mailing date: Apr. 1, 2010, 10 pages.

(Continued)

*Primary Examiner* — Hunter B Lonsberry
(74) *Attorney, Agent, or Firm* — Winston Hsu; Scott Margo

(57) ABSTRACT

A signal processing apparatus includes a first signal processing block and a second signal processing block. The first signal processing block is utilized for processing an input signal to generate a first target processing result, including a plurality of packets initially reproduced from the input signal, to an output port of the first signal processing circuit, where each of the packets contains a corresponding packet identifier (PID). The second signal processing block has an input port coupled to the output port of the first signal processing circuit, and is utilized for processing the first target processing result according to PIDs of the packets and accordingly generating a second target processing result. There is no buffer coupled between the output port of the first signal processing circuit and the input port of the second signal processing circuit.

22 Claims, 4 Drawing Sheets

(56) References Cited

U.S. PATENT DOCUMENTS

| | | |
|---|---|---|
| 6,538,999 B1 | 3/2003 | Sato |
| 7,899,929 B1 | 3/2011 | Beser |
| 8,199,750 B1 | 6/2012 | Schultz |
| 2003/0123484 A1 | 7/2003 | Harriman |
| 2004/0017831 A1 | 1/2004 | Shen |
| 2004/0030776 A1 | 2/2004 | Cantrell |
| 2006/0056407 A1 | 3/2006 | Hashimoto |
| 2007/0088877 A1 | 4/2007 | Chen |
| 2007/0130613 A1 | 6/2007 | Choi |
| 2007/0160042 A1 | 7/2007 | Dollo |
| 2008/0002742 A1 | 1/2008 | Wu |
| 2008/0008155 A1 | 1/2008 | Yoon |
| 2008/0060046 A1 | 3/2008 | Lee |
| 2008/0162639 A1 | 7/2008 | Kang |
| 2008/0240093 A1* | 10/2008 | Morad et al. .................. 370/389 |
| 2009/0154480 A1 | 6/2009 | Arai |
| 2010/0158042 A1 | 6/2010 | Yeh |
| 2010/0162089 A1 | 6/2010 | Yeh |
| 2010/0229203 A1 | 9/2010 | Lee |

FOREIGN PATENT DOCUMENTS

| | | |
|---|---|---|
| EP | 1 217 838 A1 | 6/2002 |
| EP | 1 808 994 A1 | 7/2007 |
| EP | 1 909 420 A1 | 4/2008 |
| JP | P2008141618 A | 6/2008 |
| TW | 477139 | 2/2002 |
| TW | 200701788 | 1/2007 |
| WO | 0197526 A1 | 12/2001 |
| WO | 2006113302 A1 | 10/2006 |

OTHER PUBLICATIONS

International application No. PCT/CN2009/075773, International filing date: Dec. 21, 2009, International Search Report mailing date: Apr. 1, 2010, 10 pages.

International application No. PCT/CN2009/075761, International filing date: Dec. 21, 2009, International Search Report mailing date: Apr. 1, 2010, 12 pages.

* cited by examiner

SIGNAL PROCESSING APPARATUSES CAPABLE OF PROCESSING INITIALLY REPRODUCED PACKETS PRIOR TO BUFFERING THE INITIALLY REPRODUCED PACKETS

CROSS REFERENCE TO RELATED APPLICATIONS

This application claims the benefit of U.S. Provisional Application No. 61/139,659 and U.S. Provisional Application No. 61/139,662, both filed on Dec. 22, 2008 and incorporated herein by reference.

BACKGROUND

The disclosed embodiments of the present invention relate to processing an input signal to generate a transport stream having packets included therein, and more particularly, to signal processing apparatuses capable of reducing complexity of back-end processing and/or reducing memory requirement by applying packet identifier (PID) filtering to transport stream packets initially reproduced from an input signal prior to buffering the transport stream packets.

In contrast to the analog television system using analog signals to carry audio and video information, a digital television (DTV) system sends and receives audio and video information by means of digital signals. For example, at the transmitter end, the audio and video information to be transmitted is first packetized into transport stream (TS) packets, and then the TS packets are modulated and transmitted by broadcasting techniques. Regarding the receiver end, a demodulator is required for demodulating a modulated input signal received via a tuner and an antenna to reproduce TS packets from the modulated input signal, and a smoothing buffer is generally implemented for buffering the demodulator output to smooth the TS packet output fed into the following back-end processing block. In other words, the demodulator in the conventional receiver design stores all of the reproduced TS packets into the smoothing buffer before the TS packets are processed by the back-end processing block. In the back-end processing block, a packet identifier (PID) filter is implemented for processing and de-multiplexing TS packets according to PIDs of the TS packets, which may require additional buffers for temporary data storage.

In view of above, the number of buffers and the buffering size of the conventional receiver design are large, leading to larger circuit area, higher production cost, and higher back-end processing complexity.

SUMMARY

In accordance with exemplary embodiments of the present invention, signal processing apparatuses capable of reducing complexity of back-end processing and/or reducing memory requirement are proposed. Besides, the number of buffers and the buffering size can be reduced, and the required bandwidth of delivering packets to the back-end processing block can be minimized. Thus, the overall circuit area and production cost can be reduced greatly.

According to one aspect of the present invention, a signal processing apparatus including a first signal processing block and a second signal processing block is disclosed. The first signal processing block is utilized for processing an input signal to generate a first target processing result, including a plurality of packets initially reproduced from the input signal, to an output port of the first signal processing block, where each of the packets contains a corresponding packet identifier (PID). The second signal processing block has an input port coupled to the output port of the first signal processing block, and is utilized for processing the first target processing result according to PIDs of the packets and accordingly generating a second target processing result. There is no buffer coupled between the output port of the first signal processing block and the input port of the second signal processing block.

According to another aspect of the present invention, a signal processing apparatus including a first signal processing block and a second signal processing block is disclosed. The first signal processing block is utilized for demodulating a modulated input signal to generate a first target processing result, including a plurality of packets, to an output port of the first signal processing circuit, where each of the packets contains a corresponding packet identifier (PID). The second signal processing block has an input port coupled to the output port of the first signal processing circuit, and is utilized for processing the first target processing result according to PIDs of the packets and accordingly generating a second target processing result. There is no buffer coupled between the output port of the first signal processing circuit and the input port of the second signal processing circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to reduce the complexity of the back-end processing by applying packet identifier (PID) filtering to packets initially reproduced from an input signal (e.g., a modulated input signal complying with a digital TV standard such as an Advanced Television Systems Committee (ATSC) standard or an OpenCable standard) prior to buffering the packets initially reproduced from the input signal. For clarity, certain exemplary embodiments of the present invention are given as follows.

Figure 1:
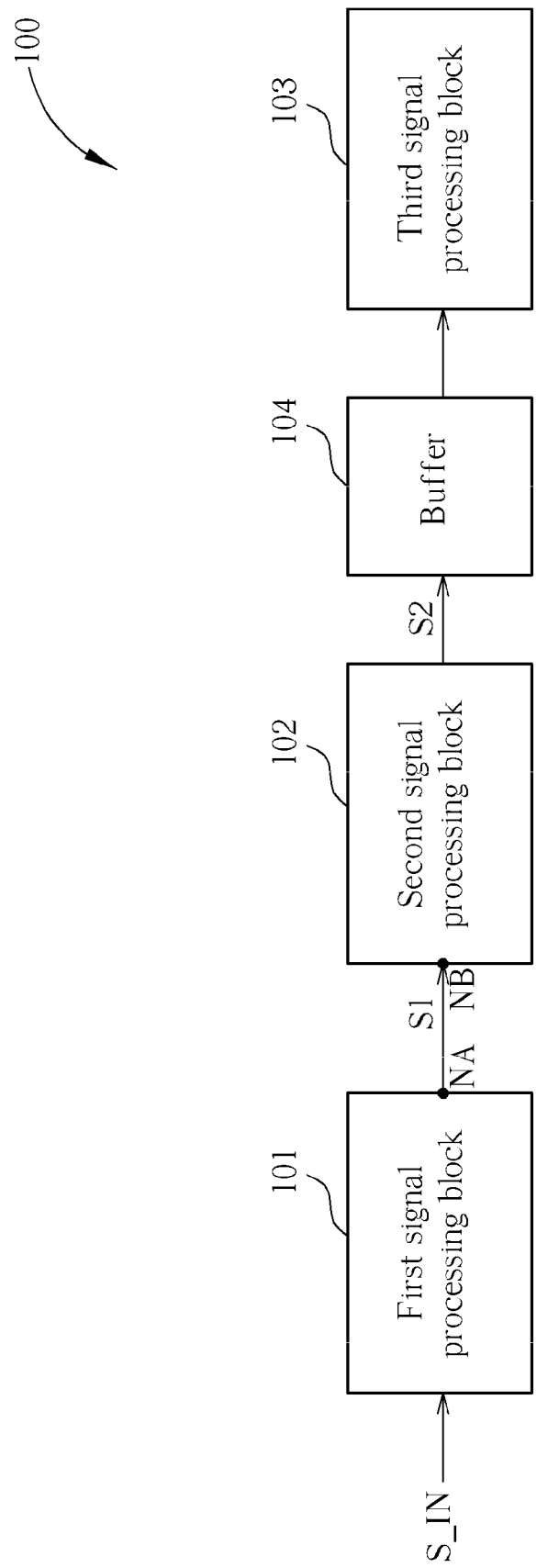
FIG. 1 is a block diagram illustrating a generalized signal processing apparatus according to an exemplary embodiment of the present invention.

FIG. 1 is a block diagram illustrating a generalized signal processing apparatus according to an exemplary embodiment of the present invention. The generalized signal processing apparatus 100 includes, but is not limited to, a plurality of signal processing blocks, such as a first signal processing block 101, a second signal processing block 102, and a third signal processing block 103, and a buffer 104. The first signal processing block 101 is utilized for processing an input signal S_IN to generate a first target processing result S1, including a plurality of packets initially reproduced from the input signal S_IN, to an output port NA of the first signal processing block 101, where each of the packets contains a corresponding packet identifier (PID). Please note that above-mentioned packets initially reproduced from the input signal S_IN are data which are in the packet format the first time after the reception of the input signal S_IN. By way of example, not limitation, the packets are transport stream packets complying with an MPEG (Moving Pictures Expert Group) standard, such as an MPEG-2 standard, and the input signal S_IN is a modulated signal complying with a digital TV standard, such as an Advanced Television Systems Committee (ATSC) standard or an OpenCable standard. Therefore, under such a scenario, the first signal processing block 101 is capable of demodulating the input signal S_IN to generate the first target processing result S1.

The second signal processing block 102 has an input port NB coupled to the output port NA of the first signal processing block 101, and is utilized for processing the first target processing result S1 according to PIDs of the packets and accordingly generating a second target processing result S2. One feature of the present invention is that there is no buffer coupled between the output port NA of the first signal processing block 101 and the input port NB of the second signal processing block 102. In this way, the packets included in the first target processing result S1 are guaranteed to be first processed by the second signal processing block 102 before stored into any buffer placed after the first signal processing block 101. Particularly, in one exemplary implementation, the input port NB of the second signal processing block 102 is directly connected to the output port NA of the first signal processing block 101 for receiving the first target processing result S1 from the first signal processing block 101. As can be seen from FIG. 1, the buffer 104 is coupled to the second signal processing block 102, and is utilized for buffering the second target processing result S2. By way of example, not limitation, the second signal processing block 102 is capable of performing a PID filtering operation to determine which packet data in the first target processing result S1 should be stored into the buffer 104. In one exemplary implementation, the second signal processing block 102 is configured to check the PIDs of the received packets included in the first target processing result S1; identify specific packets from the received packets, where a payload of each of the identified specific packets contains specific data (e.g., unwanted information); and modify at least the payload of each of the specific packets to generate a corresponding modified packet to the buffer 104. For example, the payload of the identified specific packet which contains the specific data may be modified by dropping the specific data or masking/replacing the specific data by a predetermined data pattern. Specifically, the second signal processing block 102 may check the first target processing result S1 to identify any program and system information protocol (PSIP) packet having a payload carrying descriptor data, such as service location descriptor (SLD) data, and replace the descriptor data by a predetermined data pattern which acts as a mask or drop the descriptor data. Therefore, not all of the original payloads of packets initially reproduced from the input signal S_IN are buffered, which may reduce the complexity of the following signal processing stage or alleviate the requirement of a large-sized buffer. In another exemplary implementation, the second signal processing block 102 may check the PIDs of the received packets included in the first target processing result S1 to thereby block unwanted packets from being stored into the buffer 104. Therefore, not all of the packets initially reproduced from the input signal S_IN are buffered. This alleviates the requirement of a large-sized buffer and reduces the complexity of the following signal processing stage. Particularly, the overall bandwidth between the first signal processing block 101 and the third signal processing block 103 is effectively minimized due to unwanted packet payload filtered out by the second signal processing block 102 disposed between the first signal processing block 101 and the buffer 104.

The third signal processing block 103 is coupled to the buffer 104, and utilized for processing the second target processing result S2 buffered in the buffer 104. By way of example, not limitation, the third signal processing block 103 is capable of performing back-end processing upon the second target processing result S2 to de-multiplex and/or process packets included in the second target processing result S2. Besides, the buffer 104 is preferably disposed between the second signal processing block 102 and the third signal processing block 103 such that the second signal processing block 102 stores data into the buffer 104 and the third signal processing block 103 retrieves buffered data from the buffer 104. In addition, such a configuration may reduce the number of buffers implemented in the signal processing apparatus 100, leading to smaller circuit area and lower production cost. For example, in addition to reading packets included in the second target processing result S2 from the buffer 104, the third signal processing block 103 may store results of de-multiplexing and/or processing the packets read from the buffer 104 into the buffer 104.

The generalized signal processing apparatus 100 shown in FIG. 1 is to provide an overview of the technical features of the present invention. Detailed implementations based on the architecture of the signal processing apparatus 100 are discussed hereinafter.

Figure 2:
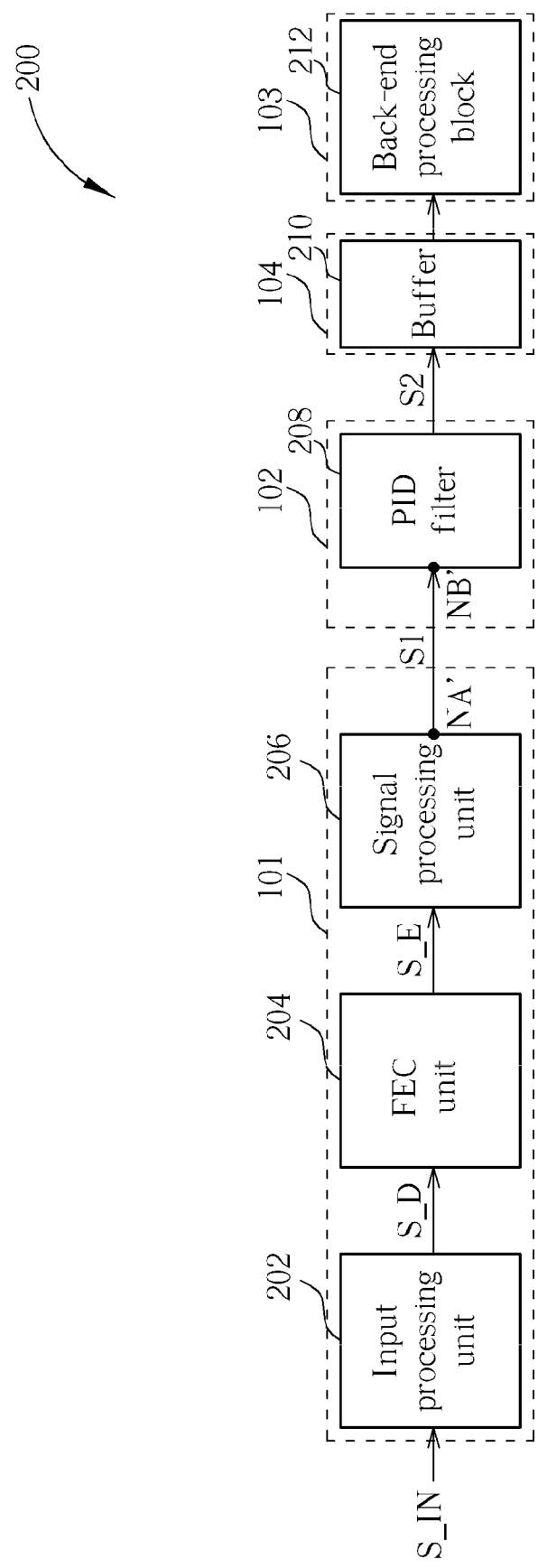
FIG. 2 is a diagram illustrating a first exemplary implementation of the signal processing apparatus shown in FIG. 1.

FIG. 2 is a diagram illustrating a first exemplary implementation of the signal processing apparatus 100 shown in FIG. 1. The exemplary signal processing apparatus shown in FIG. 2 is a receiver (e.g., a DTV receiver) 200 including an input processing unit 202, a forward error correction (FEC) unit 204, a signal processing unit 206, a PID filter 208, a buffer 210, and a back-end processing block 212. It should be noted that the first signal processing block 101 in FIG. 1 is now implemented by a combination of the input processing unit 202, the FEC unit 204, and the signal processing unit 206 in FIG. 2, the second signal processing block 102 in FIG. 1 is now implemented by the PID filter 208 in FIG. 2, the buffer 104 in FIG. 1 is now implemented by the buffer 210 in FIG. 2, and the third signal processing block 103 in FIG. 1 is now implemented by the back-end processing block 212 in FIG. 2. As mentioned above, there is no buffer coupled between the output port NA of the first signal processing block 101 and the input port NB of the second signal processing block 102. Therefore, as can be seen from FIG. 2, an output terminal NA' of the signal processing unit 206 acts as the output port NA of the first signal processing block 101, and an input terminal NB' of the PID filter 208 acts as the input port NB of the second signal processing block 102, where there is no buffer coupled between the output terminal NA' of the signal processing unit 206 and the input terminal NB' of the PID filter 208. Particularly, in one exemplary design, the input terminal NB' of the PID filter 208 is directly connected to the output terminal NA' of the signal processing unit 206.

The input processing unit 202 receives a modulated input signal (e.g., the afore-mentioned input signal S_IN) and processes the modulated input signal to generate a processed digital signal S_D. The FEC unit 204 receives the processed digital signal S_D and performs an FEC operation upon the processed digital signal S_D to generate an error-corrected digital signal S_E. In a case where the modulated input signal (e.g., S_IN) complies with the ATSC standard, the signal processing unit 206 is implemented using a de-scrambler which de-scrambles the error-corrected digital signal S_E to generate the aforementioned first target processing result S1 which is a demodulation result including a plurality of packets initially reproduced from the modulated input signal (e.g., S_IN). In another case where the modulated input signal complies with the OpenCable standard, the signal processing unit 206 is implemented using a checksum decoder which performs a MPEG framing operation upon the error-corrected digital signal S_E to generate the aforementioned first target processing result S1 which is a demodulation result including a plurality of packets initially derived from the modulated input signal (e.g., S_IN).

The PID filter 208 which acts as the aforementioned second signal processing block 102 compares a corresponding PID of each of the packets with at least one predetermined identification value to generate a corresponding comparison result, and generates the aforementioned second target processing result S2 by selectively outputting each of the packets or selectively modifying the payload of each of the packets according to at least the corresponding comparison result. For example, when a PID value of a specific packet matches with at least one predetermined identification value, the PID filter 208 identifies the specific packet as an unwanted packet, and does not store the specific packet into the buffer 210 for further back-end processing; otherwise, the PID filter 208 allows the specific packet to be stored into the buffer 210. In an alternative design, when a PID value of a specific packet matches with at least one predetermined identification value, the PID filter 208 identifies the specific packet as a wanted packet, and stores the specific packet into the buffer 210 for further back-end processing; otherwise, the PID filter 208 blocks the specific packet from being stored into the buffer 210. In another alternative design, when a PID value of a specific packet matches with at least one predetermined identification value and the payload of the specific packet carries unwanted data (e.g., SLD data), the PID filter 208 modifies the specific packet by dropping the unwanted data or replacing/masking the unwanted data by a predetermined data pattern, and generates a corresponding modified packet to the buffer 210 for further back-end processing. It should be noted that the PID filter 208 processes the packets on the fly as there is no buffer coupled between the signal processing unit 206 and the PID filter 208.

The back-end processing block 212 performs back-end processing upon the packets buffered in the buffer 210. For example, the buffered packets are de-multiplexed and/or processed by the back-end processing block 212. The complexity of the back-end processing can be reduced since only the wanted packets are allowed to be stored into the buffer 210 in one exemplary implementation, and unwanted data included in the packet payload are dropped/masked in another exemplary implementation.

Figure 3:
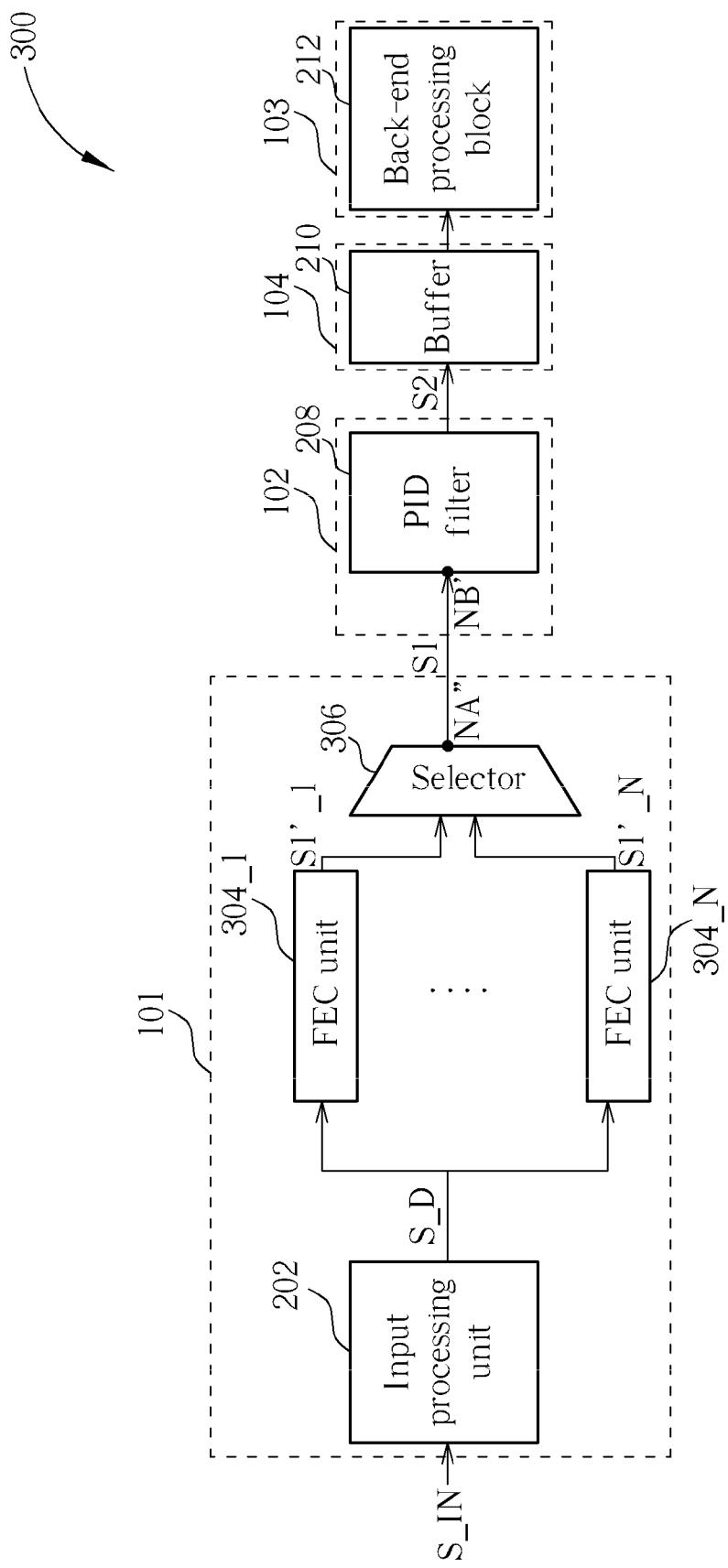
FIG. 3 is a diagram illustrating a second exemplary implementation of the signal processing apparatus shown in FIG. 1.

FIG. 3 is a diagram illustrating a second exemplary implementation of the signal processing apparatus 100 shown in FIG. 1. The exemplary signal processing apparatus shown in FIG. 3 is a receiver (e.g., a DTV receiver) 300 including the input processing unit 202, a plurality of FEC units 304_1-304_N, a selector 306, the PID filter 208, the buffer 210, and the back-end processing block 212. It should be noted that the first signal processing block 101 in FIG. 1 is now implemented by a combination of the input processing unit 202, the FEC units 304_1-304_N, and the selector 306 in FIG. 3, the second signal processing block 102 in FIG. 1 is now implemented by the PID filter 208 in FIG. 3, the buffer 104 in FIG. 1 is now implemented by the buffer 210 in FIG. 3, and the third signal processing block 103 in FIG. 1 is now implemented by the back-end processing block 212 in FIG. 3. It should be noted that the number of the FEC units implemented in the first signal processing block 101 is adjustable according to actual design requirements. As mentioned above, there is no buffer coupled between the output port NA of the first signal processing block 101 and the input port NB of the second signal processing block 102. Therefore, as can be seen from FIG. 3, an output terminal NA" of the selector 306 acts as the output port NA of the first signal processing block 101, and the input terminal NB' of the PID filter 208 acts as the input port NB of the second signal processing block 102, where there is no buffer coupled between the output terminal NA" and the input terminal NB'. Particularly, in one exemplary design, the input terminal NB' of the PID filter 208 is directly connected to the output terminal NA" of the selector 306.

The difference between the receiver 200 shown in FIG. 2 and the receiver 300 shown in FIG. 3 is that the receiver 300 is a hybrid system capable of performing different FEC operations upon the processed digital signal S_D generated from the preceding input processing unit 202 and accordingly generating a plurality of error-corrected digital signals acting as first candidate processing results S1'_1-S1'_N, respectively. By way of example, when the modulated input signal (e.g., S_IN) complies with a first coding scheme, the FEC unit 304_1 can generate an error-corrected digital signal, acting as the first candidate processing result S1'_1 corresponding to the first coding scheme, and the selector 306 therefore selects an output of the FEC unit 304_1 (i.e., the first candidate processing result S1'_1) to be the aforementioned first target processing result S1 passed to the following PID filter 208; however, when the modulated input signal (e.g., S_IN) complies with an $N^{th}$ coding scheme, the FEC unit 304_N can generate an error-corrected digital signal, acting as the first candidate processing result S1'_N corresponding to the $N^{th}$ coding scheme, and the selector 306 therefore selects an output of the FEC unit 304_N (i.e., the first candidate processing result S1'_N) to be the aforementioned first target processing result S1 passed to the following PID filter 208. Briefly summarized, the first signal processing block 101 in this exemplary implementation applies a plurality of different first signal processing operations upon the input signal S_IN to generate a plurality of first candidate processing results S1'_1-S1'_N, and outputs one of the first candidate processing results S1'_1-S1'_N to the output port as the first target processing result S1. It should be noted that the selector 306 merely guides the delivery of the packets initially reproduced from the modulated input signal without referring to packet contents to process packets passing therethrough. In addition, the PID filter 208 processes the packets on the fly as there is no buffer coupled between the selector 306 and the PID filter 208.

As a person skilled in the art can readily understand the operation of other elements included in the receiver 300 after reading above paragraphs directed to the receiver 200, further description is omitted here for brevity.

Figure 4:
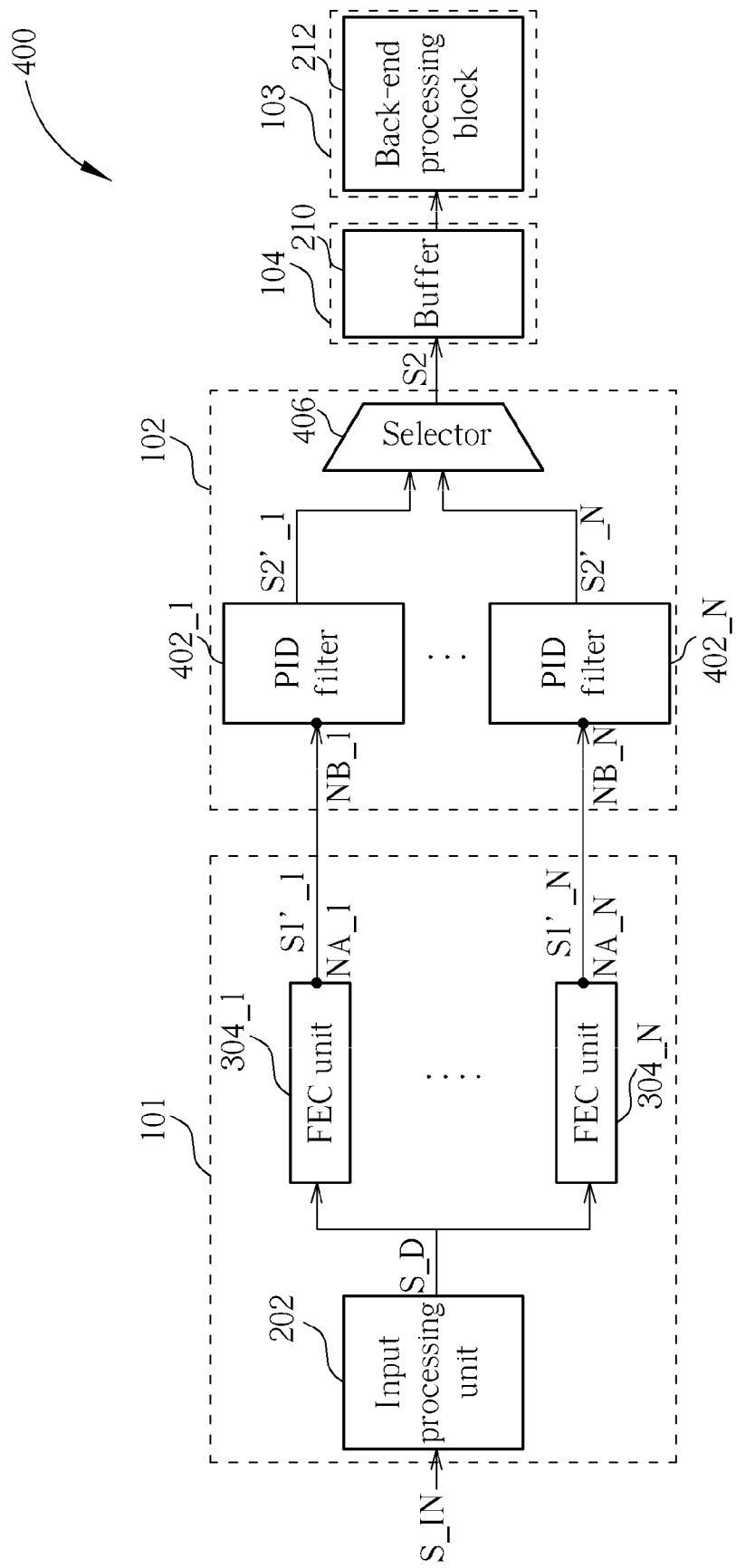
FIG. 4 is a diagram illustrating a third exemplary implementation of the signal processing apparatus shown in FIG. 1.

FIG. 4 is a diagram illustrating a third exemplary implementation of the signal processing apparatus 100 shown in FIG. 1. The exemplary signal processing apparatus shown in FIG. 4 is a receiver (e.g., a DTV receiver) 400 including the input processing unit 202, a plurality of FEC units 304_1-304_N, a plurality of PID filters 402_1-402_N, a selector 406, the buffer 210, and the back-end processing block 212. It should be noted that the first signal processing block 101 in FIG. 1 is now implemented by a combination of the input processing unit 202 and the FEC units 304_1-304_N in FIG. 4, the second signal processing block 102 in FIG. 1 is now implemented by a combination of the PID filters 402_1-402_N and the selector 406 in FIG. 4, the buffer 104 in FIG. 1 is now implemented by the buffer 210 in FIG. 4, and the third signal processing block 103 in FIG. 1 is now implemented by the back-end processing block 212 in FIG. 4. As mentioned above, there is no buffer coupled between the output port NA of the first signal processing block 101 and the input port NB of the second signal processing block 102. Therefore, as can be seen from FIG. 4, output terminals NA_1-NA_N of the FEC unit 304_1-304_N act as the output port NA of the first signal processing block 101, and input terminals NB_1-NB_N of the PID filters 402_1-402_N act as the input port NB of the second signal processing block 102, where there is no buffer coupled between an output terminal of an FEC unit and an input terminal of a corresponding PID filter. Please note that the number of the FEC units implemented in the first signal processing block 101 and the number of the PID filters implemented in the second signal processing block 102 are adjustable according to actual design requirements. In the exemplary embodiment shown in FIG. 4, there is no buffer coupled between the output terminals NA_1-NA_N of the FEC units 304_1-304_N and the corresponding input terminals NB_1-NB_N of the PID filters 402_1-402_N. Particularly, in one exemplary design, the output terminals NA_1-NA_N of the FEC units 304_1-304_N are directly connected to the corresponding input terminals NB_1-NB_N of the PID filters 402_1-402_N, respectively.

Each of the receivers 300 and 400 is a hybrid system capable of performing different FEC operations upon the processed digital signal S_D generated from the input processing unit 202. The difference between the receiver 300 shown in FIG. 3 and the receiver 400 shown in FIG. 4 is that the receiver 400 has a plurality of signal processing circuits, such as the PID filters 402_1-402_N, placed after the FEC units 304_1-304_N respectively and before the selector 406. By way of example, when the modulated input signal (e.g., S_IN) complies with a first coding scheme (e.g., a coding scheme employed in the ATSC standard), the FEC unit 304_1 can generate a first candidate processing result S1'_1 which includes a plurality of packets initially reproduced from the modulated input signal (e.g., S_IN) by performing a first FEC operation upon the processed digital signal S_D generated from the input processing unit 202, and the PID filter 402_1 can filter out the unwanted packets, identify wanted packets, or modify payloads of the packets carrying unwanted data to generate a second candidate processing result S2'_1 by checking at least PIDs of the packets generated from the preceding FEC unit 304_1. When the modulated input signal (e.g., S_IN) complies with an $N^{th}$ coding scheme (e.g., a coding scheme employed in the OpenCable standard), the FEC unit 304_N can generate another first candidate processing result S1'_N which includes a plurality of packets initially derived from the modulated input signal (e.g., S_IN) by performing an $N^{th}$ FEC operation upon the processed digital signal S_D generated from the input processing unit 202, and the PID filter 402_N can filter out unwanted packets, identify wanted packets or modify payloads of the packets carrying unwanted data to generate another second candidate processing result S2'_N by checking at least PIDs of the packets generated from the preceding FEC unit 304_N. Therefore, the selector 406 selects an output of the PID filter 402_1 (i.e., the second candidate processing result S2'_1) to be the aforementioned second target processing result S2 if the modulated input signal complies with the first coding scheme, and selects an output of the PID filter 402_N (i.e., the second candidate processing result S2'_N) to be the aforementioned second target processing result S2 if the modulated input signal complies with the $N^{th}$ coding scheme. By way of example, not limitation, the selector 406 outputs the second candidate processing result S2'_1 when the modulated input signal complies with the ATSC standard, and outputs the second candidate processing result S2'_N when the modulated input signal complies with the OpenCable standard.

Briefly summarized, the first signal processing block 101 in this exemplary implementation applies a plurality of different first signal processing operations upon the input signal S_IN to generate a plurality of first candidate processing results S1'_1-S1'_N, and the second signal processing block 102 in this exemplary implementation has a plurality of signal processing circuits for applying a plurality of different second signal processing operations upon the first candidate processing results S1'_1-S1'_N, respectively, to generate a plurality of second candidate processing results S2'_1-S2'_N. One of the first candidate processing results S1'_1-S1'_N is the aforementioned first target processing result S1, and the selector 406 outputs one of the second candidate processing results S2'_1-S2'_N as the afore-mentioned second target processing result S2.

It should be noted that the selector 406 merely guides the delivery of the packets without referring to packet contents to process packets passing therethrough. In addition, in this exemplary embodiment, the PID filter 402_1, ..., 402_N processes the packets on the fly due to the fact that there is no buffer coupled between the FEC unit 304_1, ..., 304_N and the corresponding PID filter 402_1, ..., 401_N.

As a person skilled in the art can readily understand the operation of other elements included in the receiver 400 after reading above paragraphs directed to the receiver 300, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing apparatus, comprising:
 a first signal processing block, for processing an input signal to generate a first target processing result, including a plurality of packets that are in a packet format recognizable to a second signal processing block the first time after the input signal is received by the first signal processing block, to an output port of the first signal processing circuit, wherein each of the packets contains a corresponding packet identifier (PID), wherein the input signal is not in the packet format recognizable to the second signal processing block, and the first signal processing block derives the packets from processing the input signal; and
 the second signal processing block, having an input port coupled to the output port of the first signal processing circuit, for processing the first target processing result according to PIDs of the packets and accordingly generating a second target processing result;

wherein there is no buffer coupled between the output port of the first signal processing circuit and the input port of the second signal processing circuit.

2. The signal processing apparatus of claim 1, wherein the input port of the second signal processing block is directly connected to the output port of the first signal processing block for receiving the first target processing result from the first signal processing block.

3. The signal processing apparatus of claim 1, wherein the second signal processing block compares the corresponding PID of each of the packets with at least one predetermined identification value to generate a corresponding comparison result, and generates the second target processing result by selectively outputting each of the packets or selectively modifying a payload of each of the packets according to at least the corresponding comparison result.

4. The signal processing apparatus of claim 1, wherein the first signal processing block applies a plurality of different first signal processing operations upon the input signal to generate a plurality of first candidate processing results, and outputs one of the first candidate processing results to the output port as the first target processing result.

5. The signal processing apparatus of claim 4, wherein the input port of the second signal processing block is directly connected to the output port of the first signal processing block for receiving the first target processing result from the first signal processing block.

6. The signal processing apparatus of claim 4, wherein the second signal processing block compares the corresponding PID of each of the packets with at least one predetermined identification value to generate a corresponding comparison result, and generates the second target processing result by selectively outputting each of the packets or selectively modifying a payload of each of the packets according to at least the corresponding comparison result.

7. The signal processing apparatus of claim 1, wherein the output port of the first signal processing circuit comprises a plurality of output terminals; the input port of the second signal processing block comprises a plurality of input terminals coupled to the output terminals of the output port of the first signal processing circuit, respectively; the first signal processing block applies a plurality of different first signal processing operations upon the input signal to generate a plurality of first candidate processing results to the output terminals, respectively, where one of the first candidate processing results is the first target processing result.

8. The signal processing apparatus of claim 7, wherein the second signal processing block comprises:
a plurality of signal processing circuits, for applying a plurality of different second signal processing operations upon the first candidate processing results, respectively, to generate a plurality of second candidate processing results; and
a selector, coupled to the signal processing circuits, for outputting one of the second candidate processing results as the second target processing result.

9. The signal processing apparatus of claim 8, wherein each of the signal processing circuits is configured for comparing a PID of each specific packet included in a corresponding first candidate processing result with at least one predetermined identification value to generate a corresponding comparison result, and generates a corresponding second candidate processing result by selectively outputting each specific packet included in the corresponding first candidate processing result or selectively modifying a payload of each specific packet included in the corresponding first candidate processing result according to at least the corresponding comparison result.

10. The signal processing apparatus of claim 7, wherein the input terminals of the input port of the second signal processing block are directly connected to the output terminals of the output port of the first signal processing block, respectively.

11. The signal processing apparatus of claim 1, further comprising:
a buffer, coupled to the second signal processing block, for buffering the second target processing result generated from the second signal processing block; and
a third signal processing block, coupled to the buffer, for processing the buffered second target processing result retrieved from the buffer.

12. A signal processing apparatus, comprising:
a first signal processing block, for demodulating a modulated input signal to generate a first target processing result, which is a demodulation result including a plurality of packets, to an output port of the first signal processing circuit, wherein each of the packets contains a corresponding packet identifier (PID), wherein the modulated input signal is not in a packet format recognizable to a second signal processing block; and
the second signal processing block, having an input port coupled to the output port of the first signal processing circuit, for processing the first target processing result according to PIDs of the packets and accordingly generating a second target processing result;
wherein there is no buffer coupled between the output port of the first signal processing circuit and the input port of the second signal processing circuit.

13. The signal processing apparatus of claim 12, wherein the input port of the second signal processing block is directly connected to the output port of the first signal processing block for receiving the first target processing result from the first signal processing block.

14. The signal processing apparatus of claim 12, wherein the second signal processing block compares the corresponding PID of each of the packets with at least one predetermined identification value to generate a corresponding comparison result, and generates the second target processing result by selectively outputting each of the packets or selectively modifying a payload of each of the packets according to at least the corresponding comparison result.

15. The signal processing apparatus of claim 12, wherein the first signal processing block applies a plurality of different demodulating operations upon the modulated input signal to generate a plurality of first candidate processing results, and outputs one of the first candidate processing results to the output port as the first target processing result.

16. The signal processing apparatus of claim 15, wherein the input port of the second signal processing block is directly connected to the output port of the first signal processing block for receiving the first target processing result from the first signal processing block.

17. The signal processing apparatus of claim 15, wherein the second signal processing block compares the corresponding PID of each of the packets with at least one predetermined identification value to generate a corresponding comparison result, and generates the second target processing result by selectively outputting each of the packets or selectively modifying a payload of each of the packets according to at least the corresponding comparison result.

18. The signal processing apparatus of claim 12, wherein the output port of the first signal processing circuit comprises a plurality of output terminals; the input port of the second signal processing block comprises a plurality of input terminals coupled to the output terminals of the output port of the first signal processing circuit, respectively; the first signal processing block applies a plurality of different demodulating operations upon the modulated input signal to generate a plurality of first candidate processing results to the output terminals, respectively, where one of the first candidate processing results is the first target processing result.

19. The signal processing apparatus of claim 18, wherein the second signal processing block comprises:
   a plurality of signal processing circuits, for applying a plurality of different signal processing operations upon the first candidate processing results, respectively, to generate a plurality of second candidate processing results; and
   a selector, coupled to the signal processing circuits, for outputting one of the second candidate processing results as the second target processing result.

20. The signal processing apparatus of claim 19, wherein each of the signal processing circuits is configured for comparing a PID of each specific packet included in a corresponding first candidate processing result with at least one predetermined identification value to generate a corresponding comparison result, and generates a corresponding second candidate processing result by selectively outputting each specific packet included in the corresponding first candidate processing result or selectively modifying a payload of each specific packet included in the corresponding first candidate processing result according to at least the corresponding comparison result.

21. The signal processing apparatus of claim 18, wherein the input terminals of the input port of the second signal processing block are directly connected to the output terminals of the output port of the first signal processing block, respectively.

22. The signal processing apparatus of claim 12, further comprising:
   a buffer, coupled to the second signal processing block, for buffering the second target processing result generated from the second signal processing block; and
   a third signal processing block, coupled to the buffer, for processing the buffered second target processing result retrieved from the buffer.

* * * * *